United States Patent
Eroglu et al.

(10) Patent No.: US 9,708,983 B2
(45) Date of Patent: Jul. 18, 2017

(54) GAS TURBINE WITH SEQUENTIAL COMBUSTION ARRANGEMENT

(71) Applicant: ALSTOM Technology Ltd, Baden (CH)

(72) Inventors: Adnan Eroglu, Untersiggenthal (CH); Juergen Hoffmann, Untersiggenthal (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 273 days.

(21) Appl. No.: 14/501,651

(22) Filed: Sep. 30, 2014

(65) Prior Publication Data
US 2015/0107259 A1    Apr. 23, 2015

(30) Foreign Application Priority Data

Oct. 1, 2013  (EP) .................................... 13186852

(51) Int. Cl.
*F02C 9/26*     (2006.01)
*F23R 3/34*     (2006.01)
(Continued)

(52) U.S. Cl.
CPC .................. *F02C 9/26* (2013.01); *F02C 3/14* (2013.01); *F02C 9/263* (2013.01); *F02C 9/28* (2013.01); *F23C 6/047* (2013.01); *F23N 1/002* (2013.01); *F23R 3/34* (2013.01); *F23R 3/346* (2013.01); *F23N 2027/10* (2013.01);
(Continued)

(58) Field of Classification Search
CPC .... F02C 9/26; F02C 9/263; F02C 9/28; F02C 3/14; F23R 3/346; F23R 3/34; F23C 6/00; F23C 6/042; F23C 6/045; F23C 6/047
See application file for complete search history.

(56) References Cited

U.S. PATENT DOCUMENTS 4,735,052 A    4/1988  Maeda et al.
5,226,287 A *  7/1993  Ng ............................ F02C 9/28
                                                        60/39.281
(Continued)

FOREIGN PATENT DOCUMENTS

DE    195 47 913 A1    6/1997
DE    103 12 971 A1    12/2004
(Continued)

*Primary Examiner* — Steven Sutherland
(74) *Attorney, Agent, or Firm* — Buchanan Ingersoll & Rooney PC

(57) ABSTRACT

The present disclosure refers to a method for operating a gas turbine with sequential combustors having a first-burner, a first combustion chamber, and a second combustor arranged sequentially in a fluid flow connection. To minimize emissions and combustion stability problems during transient changes when the fuel flow to a second combustor is initiated the method includes the steps of increasing the second fuel flow to a minimum flow, and reducing the first fuel flow to the first-burner of the same sequential combustor and/or the fuel flow to at least one other sequential combustor of the sequential combustor arrangement in order keep the total fuel mass flow to the gas turbine substantially constant. Besides the method a gas turbine with a fuel distribution system configured to carry out such a method is disclosed.

4 Claims, 6 Drawing Sheets

(51) Int. Cl.
*F02C 9/28* (2006.01)
*F23C 6/04* (2006.01)
*F23N 1/00* (2006.01)
*F02C 3/14* (2006.01)

(52) U.S. Cl.
CPC ...... *F23N 2037/02* (2013.01); *F23N 2041/20* (2013.01); *F23R 2900/03341* (2013.01)

(56) References Cited

U.S. PATENT DOCUMENTS

| | | | |
|---|---|---|---|
| 5,311,742 A | | 5/1994 | Izumi et al. |
| 6,584,775 B1 | * | 7/2003 | Schneider ................ F02C 9/16 60/775 |
| 2003/0150216 A1 | * | 8/2003 | O'Beck .................... F02C 3/30 60/775 |
| 2004/0211186 A1 | | 10/2004 | Stuttaford et al. |
| 2009/0145131 A1 | * | 6/2009 | Kreutle ................... F02C 7/228 60/734 |
| 2011/0239652 A1 | * | 10/2011 | McMahan ................ F23R 3/34 60/737 |

FOREIGN PATENT DOCUMENTS

| | | |
|---|---|---|
| EP | 0 321 809 A1 | 6/1989 |
| EP | 1 521 037 A1 | 4/2005 |
| EP | 2 722 591 A1 | 4/2014 |
| GB | 2 287 312 A | 9/1995 |
| JP | S61110817 A | 5/1986 |
| JP | H02309123 A | 12/1990 |
| WO | 2007/141101 A1 | 12/2007 |
| WO | 2010/112318 A1 | 10/2010 |

* cited by examiner

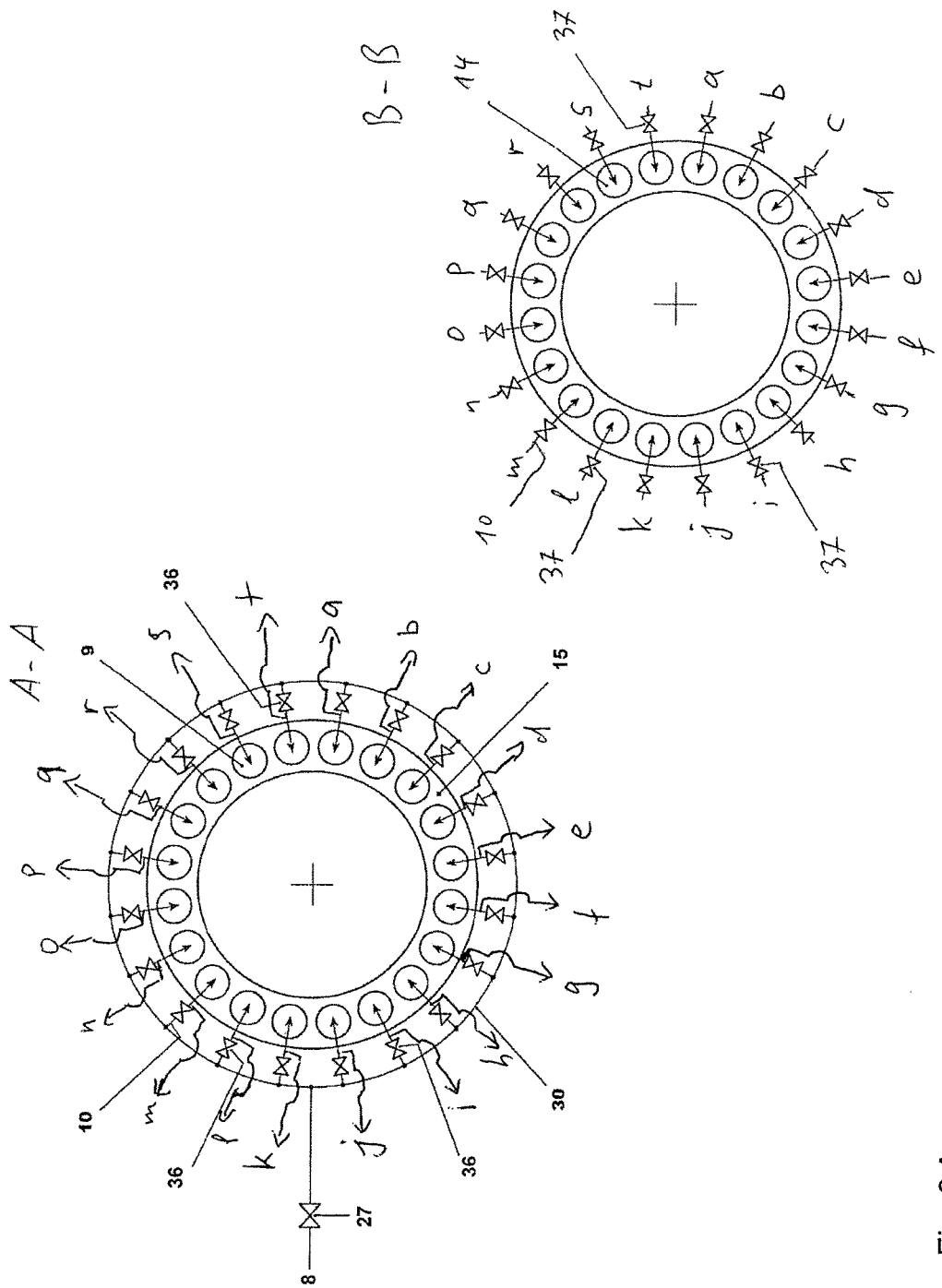

GAS TURBINE WITH SEQUENTIAL COMBUSTION ARRANGEMENT

CROSS-REFERENCE TO RELATED APPLICATIONS

This application claims priority to European application 13186852.3 filed Oct. 1, 2013, the contents of which are hereby incorporated in its entirety.

TECHNICAL FIELD

The invention refers to a method for operating a gas turbine with sequential combustor arrangement. The invention additionally refers to a gas turbine with a fuel distribution system adapted to carry out such a method.

BACKGROUND

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and to increase operational flexibility sequential combustion has been suggested. Depending on the operating conditions, in particular on the hot gas temperature of a first combustion chamber it can be advantageous to cool the hot gases before they are admitted to a second burner 5 (also called sequential burner). Such cooling has been described in DE 10312971 A1. It can be advantageous to allow fuel injection and premixing of the injected fuel with the hot flue gases of the first combustor in the second burner.

Operation methods for steady state at base load have been described for sequential combustion. However, when switching on or off the second stage of a sequential combustion arrangement flame instabilities and increased emissions can occur due to a shift of fuel flow form the first to the second stage or vice versa. Due to this shift of fuel flow the local fuel to combustion air or fuel to oxidizer ratio can shift out of the design range for clean stable combustion.

SUMMARY

The object of the present disclosure is to propose a method for operating a gas turbine comprising at least a compressor, a sequential combustor arrangement with a plurality of sequential combustors, and a turbine downstream of the sequential combustor arrangement. Each sequential combustor comprises a first-burner, a first combustion chamber, and a second combustor arranged sequentially in a fluid flow connection.

Typically such a sequential combustor arrangement comprises sequential combustors in a can architecture. The sequential combustor arrangement can also be in an annular arrangement with an annular first combustion chamber downstream of the first burners. The second combustors can also be arranged in annular architectures. A combination of can architecture first combustion chambers and annular second combustors or annular first combustion chambers and can architecture second combustors is also conceivable.

The method for operation comprises the steps of compressing the inlet gas in the compressor, admixing a first fuel in the first-burners of the sequential combustor, burning the mixture of first fuel and compressed gas in the first combustion chamber to obtain first combustor combustion products. The method can further comprise the step of admixing dilution gas to the first combustor combustion products.

Dilution gas for injection into the second combustor can for example be compressed air or a mixture of air and flue gases of a gas turbine. Also compressed flue gases can be used as dilution gas. It is injected to control the temperature and temperature distribution in the second combustor.

At low relative load no further fuel is injected into the sequential combustor downstream of the first-burner, and the first combustor combustion products are expended in the turbine after passing through the second combustor. At high relative load a second fuel is injected into the sequential combustor downstream of the first combustion chamber and the mixture of first combustor combustion products, the second fuel, and dilution gas (if admixed) is burned to obtain second combustor combustion products. These combustion products are expanded in the turbine.

To minimize emissions and combustion stability problems during transient changes when the fuel flow to a second combustor is initiated the method further comprises the steps of increasing the second fuel flow to a minimum flow, and reducing the first fuel flow to the first-burner of the same sequential combustor and/or the fuel flow to at least one other sequential combustor of the sequential combustor arrangement in order keep the total fuel mass flow to the gas turbine substantially constant. The minimum fuel can be in the order of 5% to 20% of the design mass flow to the second combustor, and can typically be smaller than 10%. The minimum flow assures stable combustion or exothermic reaction in the second combustor. In particular pulsations and CO emissions due to an unstable inflow of fuel have to be avoided. Further, a minimum flow assures that there will be no backflow of hot gas into the fuel gas distribution system.

A decrease in the fuel mass flow of a first burner when initiating fuel supply to a second combustor can also reduce NOx emissions.

Low relative load is typically a load below 50% relative load, i.e. load normalized with the base load power of the plant at the respective ambient conditions (environmental conditions, i.e. temperature, pressure and humidity). High relative load is typically a load above 50% relative load, i.e. load normalized with the base load power of the plant at the respective ambient conditions. The threshold between low and high relative load depends on the gas turbine design, operating conditions and emissions targets and can on the one hand be below 30% relative load or even below 20% or 10% or on the other hand as high as 60% or even 70%.

Deviations from prescribed inlet temperatures into the reaction zone of the second combustor may result in high emissions (e.g. NOx, CO, and unburned hydrocarbons) and/or flashback in the second combustor. Flashback and NOx are induced by the reduced self-ignition time for the injected fuel due to a high combustor inlet temperature or high oxygen concentration, which causes earlier ignition (leading to flashback) or reduced time for fuel air mixing, which results in local hot spots during combustion and consequently increased NOx emission. Low temperature regions can cause CO emissions, due to the increased self-ignition time. This can reduce the time for CO to CO2 burnout, and a reduced local flame temperature, which can further slowdown the CO to CO2 burnout. Finally, local hot spots may lead to overheating in certain regions downstream of the second fuel injection. Dilution gas can be injected to control the inlet conditions into the reaction zone of the second combustor. Dilution gas can be injected separately or as a mixture with the second fuel.

In a further embodiment of the method the increase of the second fuel flow to the minimum flow and the reduction of fuel flow to the first-burner of the same sequential combustor and/or reduction of the fuel flow to at least one other sequential combustor is synchronized the during initiation of second fuel flow to keep the total fuel flow to the sequential combustor arrangement substantially constant.

According to another embodiment of the method the first fuel flow to the first-burner in the same sequential combustor, in which the second fuel flow is initiated, is reduced. Thereby the total fuel flow to this specific sequential combustor can be kept constant during initiation of the second fuel injection.

According to an alternative embodiment of the method the fuel flow to at least one neighboring sequential combustor of the sequential combustor, into which a second fuel flow is initiated, is reduced.

In a further embodiment of the method the second fuel flow is initiated at the same time to a plurality of sequential combustors.

In yet a further embodiment of the method the second fuel flow to all the sequential combustors of the sequential combustor arrangement is initiated at the same time and the first fuel flow to all the first-burners of the sequential combustor arrangement is reduced at the same time.

While the initiation of a second fuel flow to one combustor can be carried out at basically one load setting and without a change of load, the initiation of subsequent second fuel injections can be proportional to load. After initiation of a second fuel injection the total fuel flow to the gas turbine is increased due to the increase in load until the local fuel to air ratios are back to a limit value for initiation of the next second fuel injection and then additional second fuel injection is carried out. A limit value for initiation of the next second fuel injection can for example be a temperature or pressure, in particular a combustion temperature or hot gas temperature.

According to one embodiment of the method the second fuel flow to the sequential combustors is initiated sequentially for individual sequential combustors or initiated for groups of sequential combustors as a function of load, a temperature or pressure indicative of the load.

Temperatures indicative of the gas turbine load are for example the turbine inlet temperature, a hot gas temperature, the turbine exhaust temperature or a flame temperature. A pressure indicative of the gas turbine load is for example the compressor exit pressure or combustion pressure. These pressures or temperatures can be measured directly or estimated based on measurements taken at other locations of the gas turbine as for example bleed or cooling air temperatures and pressures.

Further, a combustor pulsation level can also be used to control the split between first burner and second fuel injection; respectively the initiation and switch off of the second fuel injection can be controlled as a function of combustor pulsations. In particular if a threshold value in pulsations in a first burner is exceeded when increasing the load of the gas turbine the fuel supply to a second fuel injection can be initiated. If the second combustor is already in operation more fuel can be shifted to the second fuel injection. If a threshold value in pulsations in a second reaction zone is exceeded when reducing the load of the gas turbine the fuel supply to a second fuel injection can be stopped.

According to a further embodiment of the method the first fuel flow to the first-burner of the same sequential combustor and/or the fuel flow to at least one other sequential combustor which was reduced upon initiation of the second fuel flow is increased back to the fuel flow before initiation of the second fuel flow. Only after the original fuel flow is reached the second fuel flow to the next sequential combustor or next group of sequential combustors is initiated.

More specifically, according to the method the fuel flow to the first-burner of the same sequential combustor arrangement and/or the fuel flow to at least one other sequential combustor, which was reduced upon initiation of the second fuel flow, is increased back to the fuel flow before initiation of the second fuel. After the fuel flows before initiation of the second fuel injection are reached again, the second fuel flow is increased above the minimum flow to control the load of the gas turbine.

According to a further embodiment of the method the switching off of the second fuel injection is carried out in reverse order.

In particular the method comprises the steps of reducing the fuel flow to the second fuel injection to a minimum fuel, stopping a second fuel injection, and at the same time increasing a fuel flow to a first burner of the same sequential combustor or to at least one sequential combustor of the sequential combustor arrangement to keep the total fuel mass flow to the gas turbine constant.

According to a specific embodiment of the method all first-burners and second fuel injections are brought into operation and the fuel flow to at least one first-burner is increased over the fuel flow to at least another first-burner of the sequential combustor arrangement. At the same time the fuel flow to the second fuel injection of the sequential combustor with increased fuel flow to its first-burner is reduced compared to the fuel flow to at least another second fuel injection of the sequential combustor arrangement such that the total fuel flow to the sequential combustor remains unchanged. Such increases respectively decrease of fuel flow to first-burners and second combustors leads to a staging between sequential combustor and can increase flame stability.

Thus a staging between neighboring burners can be realized for the first combustion chambers and for the second combustors while maintaining a homogeneous turbine inlet temperature in circumferential direction for all sequential combustors.

The limit value, which triggers the switch off of the second fuel injection, can be provided with a hysteresis in order to avoid a repeated initiation and switch off of second fuel injection with slight variation in relative load or another operating parameter, which can be used as a threshold for initiating fuel supply to a second fuel injection. That is to say, that for example the relative load at which the second fuel injection is stopped is lower than the relative load that at which it is initiated.

In addition to the method, a gas turbine for implementing the method is a subject of the invention. Depending upon the chosen method or combination of methods, the design of the gas turbine has to be adapted and/or the fuel distribution system has to be adapted in order to ensure the feasibility of the method.

According to a first embodiment the gas turbine comprises at least a compressor, a sequential combustor arrangement with a plurality of sequential combustors, and a turbine downstream of the sequential combustor arrangement. Each sequential combustor comprises a first-burner with a first fuel injection, a first combustion chamber, and a second combustor with a second fuel injection and second reaction zone arranged sequentially in a fluid flow connection. Further the gas turbine comprises a fuel distribution system for supplying fuel to the first fuel injection, and to the second fuel injection. The fuel distribution system comprises a fuel control valve, and a fuel ring main for supplying and controlling the fuel to the first fuel injection. The fuel distribution system is characterized in that at least one supply line to the second fuel injection is branched off downstream of the fuel control valve for supplying fuel to the first fuel injection, and in that a second fuel control valve is arranged in the supply line to the second fuel injection.

The second fuel control valve allows a shift in the fuel supply from the first fuel injection respectively from a first combustor to the second fuel injection.

According to an embodiment the sequential combustor arrangement can further comprise a dilution gas injection in the second combustor upstream of the second reaction zone.

According to a further embodiment the sequential combustor arrangement of the gas turbine comprises a first group of first-burners connected to a first first-burner group fuel ring main, a second group of first-burners connected to a second first-burner group fuel ring main, a first group of second fuel injectors connected to a first sequential-group fuel ring main, and a second group of second fuel injectors connected to second sequential-group fuel ring main.

In the fuel gas distribution system of this sequential combustor arrangement a first-burner group fuel control valve is arranged in a supply line to the first first-burner group fuel ring main, a second burner group fuel control valve is arranged in a supply line to the second first-burner group fuel ring main, a supply line for the first sequential-group fuel ring main is branched off downstream of the first first-burner group fuel control valve, and a first sequential-group fuel control valve is arranged in this branched line. Further, a supply line for the second sequential-group fuel ring main is branched off downstream of the second first-burner group fuel control valve, and a second sequential-group fuel control valve is arranged in this branched line. In this sequential combustor arrangement each second fuel injector of the first group of second fuel injectors is arranged downstream of one first-burner of the first group of first-burners in one sequential combustor.

According to an alternative embodiment the sequential combustor arrangement of the gas turbine comprises a first group of first-burners connected to a first first-burner group fuel ring main, a second group of first-burners connected to a second first-burner group fuel ring main, a first group of a second fuel injectors connected to a first sequential-group fuel ring main, and a second group of second fuel injectors connected to second sequential-group fuel ring main.

In the fuel gas distribution system of this sequential combustor arrangement a first-burner group fuel control valve is arranged in a supply line to the first first-burner group fuel ring main, a second burner group fuel control valve is arranged in a supply line to the second first-burner group fuel ring main, a supply line for the first sequential-group fuel ring main is branched off downstream of the first first-burner group fuel control valve, and a first sequential-group fuel control valve is arranged in this branched line. Further, supply line for the second sequential-group fuel ring main is branched off downstream of the second first-burner group fuel control valve, and a second sequential-group fuel control valve is arranged in this branched line. In this sequential combustor arrangement each second fuel injector of the first group of a second fuel injectors is arranged downstream of one first-burner of the second group of first-burners in one sequential combustors.

In yet another alternative embodiment each second fuel injector of the sequential combustor arrangement is connected to a supply line branched off downstream of the fuel control valve for controlling the fuel injection into the first burners with a fuel feed having a single injector fuel control valve.

For the first combustor different burner types can be used. For example so called EV burner as known for example from the EP 0321809 or AEV burners as known for example from the DE 19547913 can be used. Also a BEV burner comprising a swirl chamber as described in the European Patent application EP12189388.7, which is incorporated by reference, can be used. In a can architecture a single or a multiple burner arrangement per can combustor can be used. Further, a flame sheet combustor as described in US 2004/0211186, which is incorporated by reference, can be used as first combustor.

The second combustor can simply comprise a second fuel injection followed by a reaction zone. The second combustor can additionally comprise a dilution gas admixer upstream of the second fuel injection.

The second combustor can for example also comprise a burner for fuel injection and mixing of the fuel with combustion products of the first combustor, and a combustion chamber arranged downstream of the burner. Such a second burner can further comprise a dilution gas admixer.

BRIEF DESCRIPTION OF THE DRAWINGS

The disclosure, its nature as well as its advantages, shall be described in more detail below with the aid of the accompanying schematic drawings.

Referring to the drawings:

FIG. 9A shows a cut through the section A-A of the first burner and FIG. 9B shows a section B-B of the second combustor with a fuel gas distribution system individual fuel gas control valves for all first burners and all second fuel injections arranged to shift fuel gas between the first burner and the second fuel injection of each sequential combustor.

DETAILED DESCRIPTION

Figure 1:
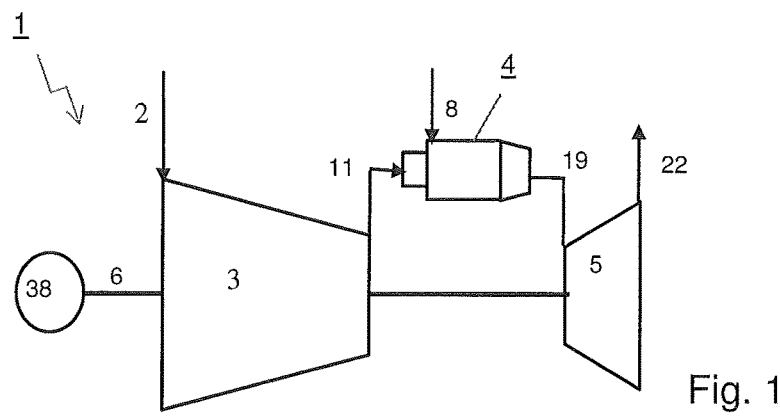
FIG. 1 shows a gas turbine with a compressor, a sequential combustion arrangement, and a turbine.

FIG. 1 shows a gas turbine 1 with a sequential combustor arrangement 4. It comprises a compressor 3, a sequential combustor arrangement 4, and a turbine 5.

Intake air 2 is compressed to compressed gas 11 by the compressor 3. Fuel 8 is burned with the compressed gas in the sequential combustor arrangement 4 to generate combustion products 19. These are expended in the turbine 6 generating mechanical work.

Typically, the gas turbine system includes a generator 38 which is coupled to a shaft 6 of the gas turbine 1. The gas turbine 1 further comprises a cooling system for the turbine 5 and sequential combustor arrangement 4, which is not shown as they are not the subject of this disclosure.

Exhaust gases 22 leave the turbine 5. The remaining heat is typically used in a subsequent water steam cycle, which is also not shown here.

Figure 2:
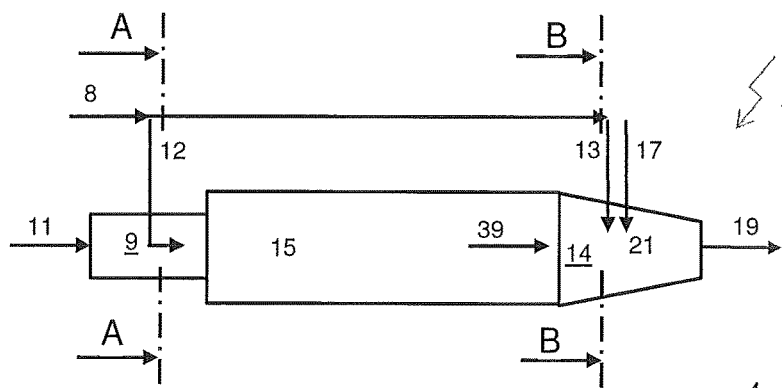
FIG. 2 shows a sequential combustion arrangement with a first burner, first combustion chamber, a second combustor with fuel injection and dilution gas injection as well as a second combustion zone.

A first example of a sequential combustor arrangement 4 is shown in FIG. 2. This sequential combustor arrangement 4 comprises a first burner 9 into which the compressed gas 11 and the first fuel 12 is admitted. The mixture of compressed gas 11 and first fuel 12 is burned in the first combustion chamber generating first combustion products 39. These flow into the second combustor 14 arranged downstream of the first combustion chamber.

In this embodiment with a can architecture the first combustion chamber 15 has a smooth cylindrical flow path. The transition from a circular cross section of the first combustion chamber 15 to a cross section with a shape of a section of an annulus or practically rectangular flow cross section at the outlet, i.e. at the turbine inlet, is integrated into the second combustor 14.

The second combustor 14 comprises a dilution gas injection 17 and a second fuel injection 13. The mixture of first combustion products 39, dilution gas 17 and second fuel 13 react in the second reaction zone 21 of the second combustor 14 2 5 forming combustion products 19 which leave the second combustor 14 and are admitted to the turbine.

Figure 3:
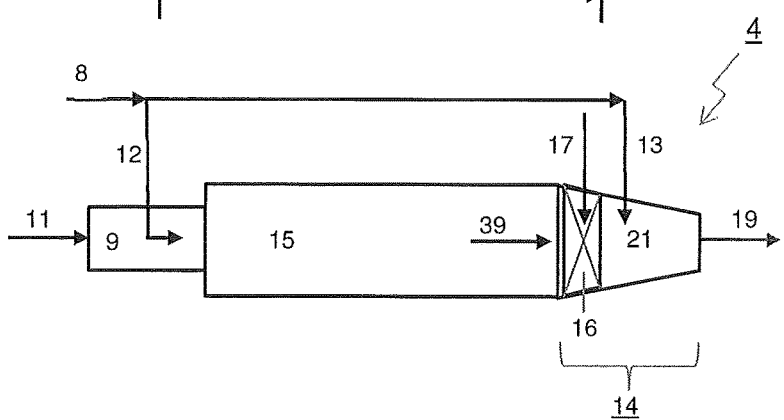
FIG. 3 shows a sequential combustion arrangement with a first burner, first combustion chamber, a second combustor with a dilution gas admixer, second fuel injection and a second combustion zone.
Figure 4:
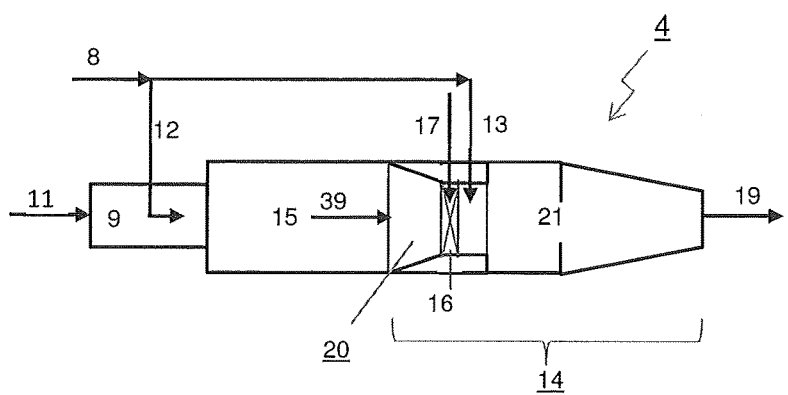
FIG. 4 shows a gas turbine with a sequential combustion arrangement with a first burner, first combustion chamber, a second burner with dilution gas admixer and a fuel injection followed by a second combustion chamber with a second combustion zone.

In this example the first fuel 12 and second fuel 13 have a common fuel 8 supply. However, they can also have separate fuel sources using different fuel types. The embodiments of FIGS. 3 and 4 are based on FIG. 2. In the example shown in FIG. 3 the dilution gas 17 and first combustion products 39 are mixed in a dilution gas mixer 16 before the second fuel 13 is injected.

In the example shown in FIG. 4 the second combustor comprises a second burner 20. The first combustion products 39 are admitted to the second burner 20 at an upstream end. Dilution gas 17 is admixed in a mixer 16, which is integrated into the second burner 20 and second fuel 13 is injected into the second burner 20 and mixed with the first combustion products 39, dilution gas 17 and second fuel 13. The second fuel 13 can also be admitted to the mixer 16 and mixed with the first combustion products 39 and dilution gas 17 in the mixer 16 (not shown here).

In this example the cross section of the flow path of the second burner 20 at the outlet is smaller than the cross section of the subsequent second reaction zone 21 for flame stabilization.

Different exemplary embodiments of fuel and dilution gas injection devices for the second combustor are shown in FIGS. 5A to 5D.

Figure 5A:
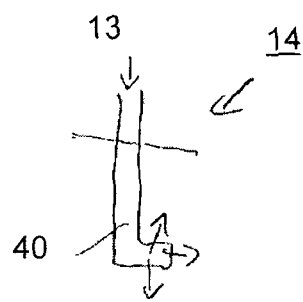
FIGS. 5A-E show different fuel and dilution gas injection devices for the second combustor.

FIG. 5A shows an example of a second fuel-admixing into the second combustor 14 with a fuel lance 40 for second fuel injection 13.

Figure 5B:
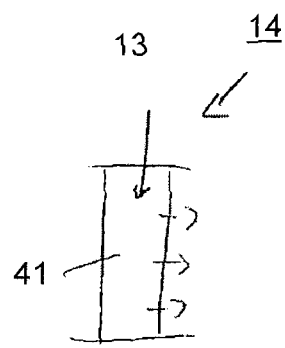

FIG. 5B shows an example of a second fuel-admixing into the second combustor 14 with a flute arrangement 41 for second fuel injection 13.

Figure 5C:
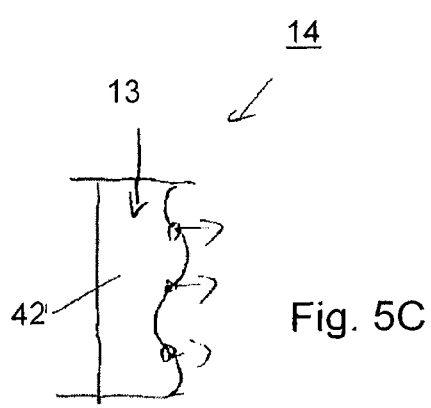

FIG. 5C shows an example of a second fuel-admixing into the second combustor 14 with a lobed mixer 42 for second fuel injection 13.

Figure 5D:
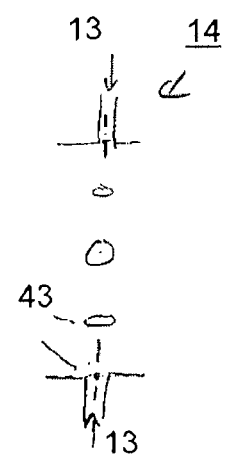

FIG. 5D shows an example of a second fuel-admixing into the second combustor 14 with circumferentially distributed side wall holes 43 for second fuel injection 13.

Figure 5E:
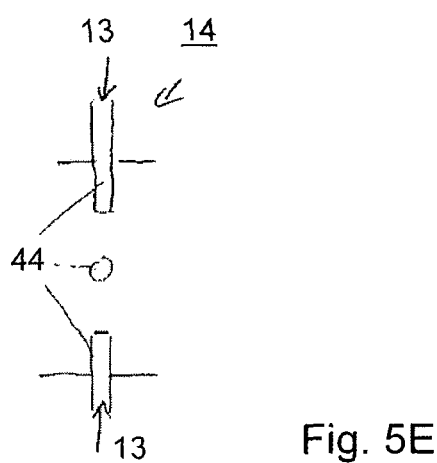

FIG. 5E shows an example of a second fuel-admixing into the second combustor 14 with circumferentially distributed side wall injection pipes 44 for second fuel injection 13.

In all examples dilution gas 17 (not shown) can be injected together with the second fuel 13.

Details of different exemplary embodiments of the fuel gas distribution system are shown in FIGS. 6 to 10.

Figure 6:
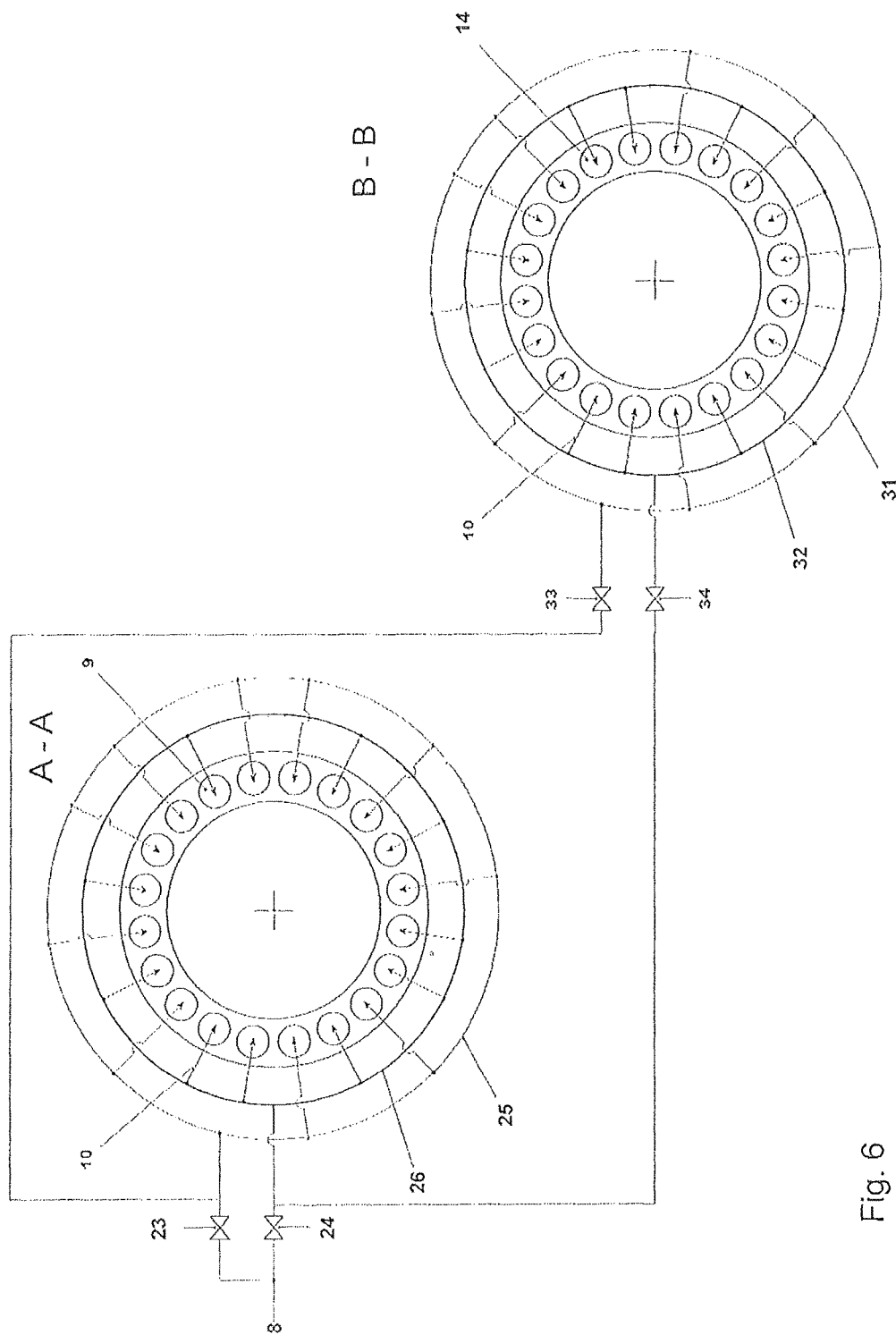
FIG. 6 shows a cut through of the section A-A of the first burner and section B-B of the second combustor with a fuel gas distribution system for two burner groups in which the fuel distribution can be shifted between the first burner and second fuel injection of the sequential combustor of the same group.

FIG. 6 shows the section A-A of FIG. 2 cut through the first burner and section B-B of FIG. 2 cut through the second combustor with an exemplary fuel distribution system.

The fuel 8 is supplied via a main fuel line and branched into a supply line for the first first-burner group fuel ring main 25 and a supply line for the second first-burner group fuel ring main 26. A first first-burner group fuel control valve 23 is arranged in the fuel line to the first first-burner group fuel ring main 25 and a second first-burner group fuel control valve 24 is arranged in the fuel line to the second first-burner group fuel ring main 26. Each first burner 9 is supplied with fuel from a fuel ring main 25, 26 via a fuel feed 10. In the shown example half the burners 9 are connected to the first first-burner group fuel ring main 25 and the other half of the burners 9 are connected to the second first-burner group fuel ring main 26. The burners can alternatingly be connected to the first, respectively second first-burner group fuel ring main 25, 26. In this example some burners are alternatingly connected to the two fuel ring mains 25, 26 and some are connected in pair arrangements, which can be advantageous to mitigate pulsations.

Downstream of the first first-burner group fuel control valve 23 a fuel line is branched off to the first sequential-group fuel ring main 31, and downstream of the second first-burner group fuel control valve 24 a fuel line is branched off to the second sequential-group fuel ring main 32.

A first sequential-group fuel control valve 33 is arranged in the fuel line to the first sequential-group fuel ring main 31 and a second sequential-group fuel control valve 34 is arranged in the fuel line to the second sequential-group fuel ring main 32. Each second combustor 14 is supplied with fuel from a sequential-group fuel ring 5 main 31, 32 via a fuel feed 10.

The second combustors 14 of first sequential-group are arranged downstream of the first combustors 9 of the first first-burner group in the sequential combustor arrangement. When opening the second sequential-group control valve 34 fuel is shifted from the first first-burner group to the second combustors 14 of the first sequential-group. Analogously fuel is shifted from the second first-burner group to the second combustors of the second sequential-group when the first sequential-group fuel control valve 33 is opened.

Figure 7:
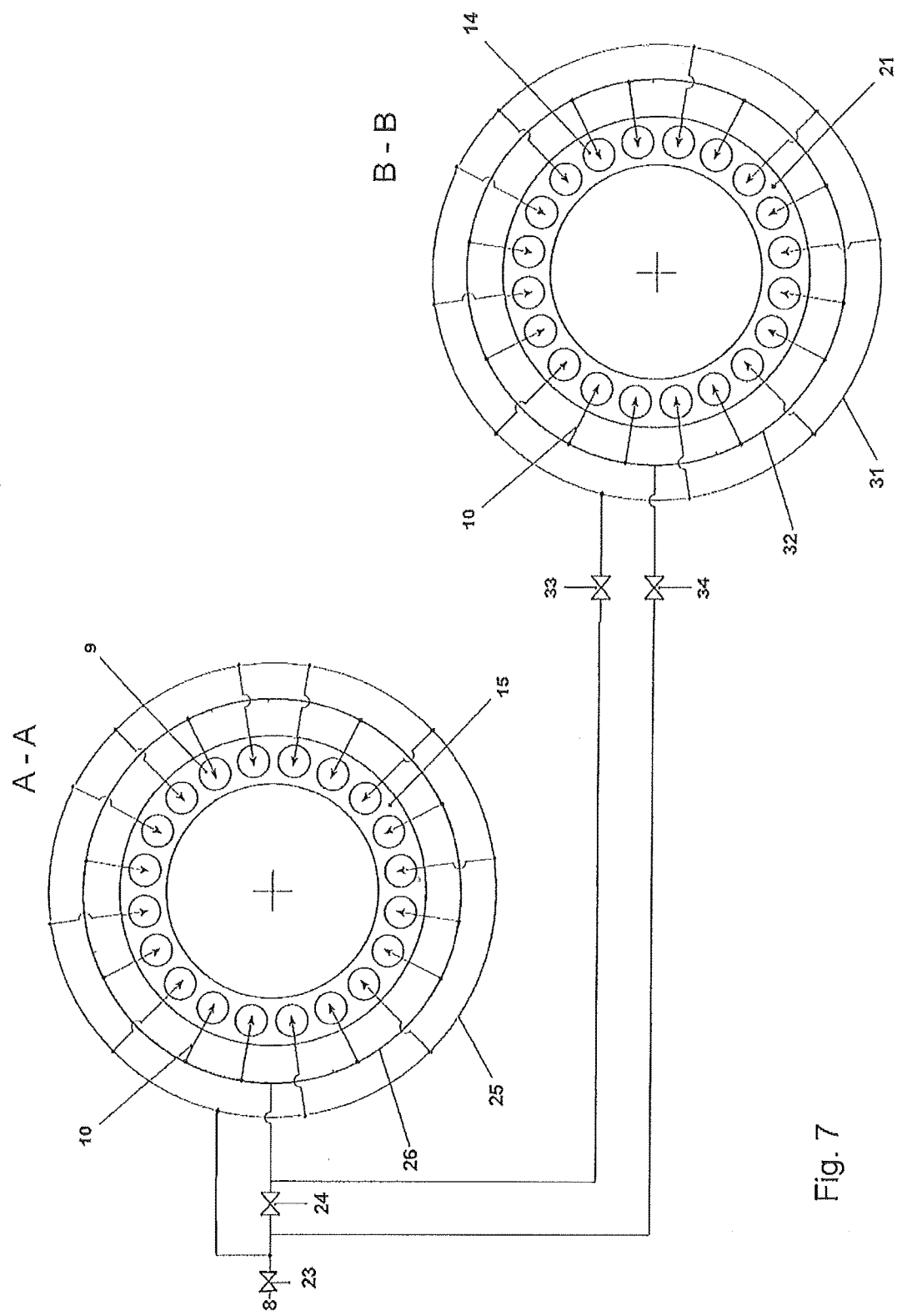
FIG. 7 shows a cut through the section A-A of the first burner and section B-B of the second combustor with a fuel gas distribution system for two burner groups of equal size in which the fuel distribution can be shifted between the first burner of a group of first burners and the second fuel injection of the sequential combustors of the neighboring group.

FIG. 7 is based on the FIG. 6 but the first first-burner group fuel control valve 23 is arranged upstream of the branch off of the fuel line to the second first-burner group fuel ring main 26; thus the first first-burner group fuel control valve 23 is effectively controlling the total fuel 8 flow.

In addition, the example of FIG. 7 is different in that the fuel line to the first sequential-group fuel ring main 31 is branched off downstream of the second first-burner group fuel control valve 24, and in that the fuel line to the second sequential-group fuel ring main 32 is branched off between first first-burner group fuel control valve 23 and the second first-burner group fuel control valve 24.

When opening the second sequential-group control valve 34 fuel is shifted from the first first-burner group to the second combustors of the second sequential-group. Analogously fuel is shifted from the second first-burner group to the second combustors of the first sequential-group when the first sequential-group fuel control valve 33 is opened.

Figure 8:
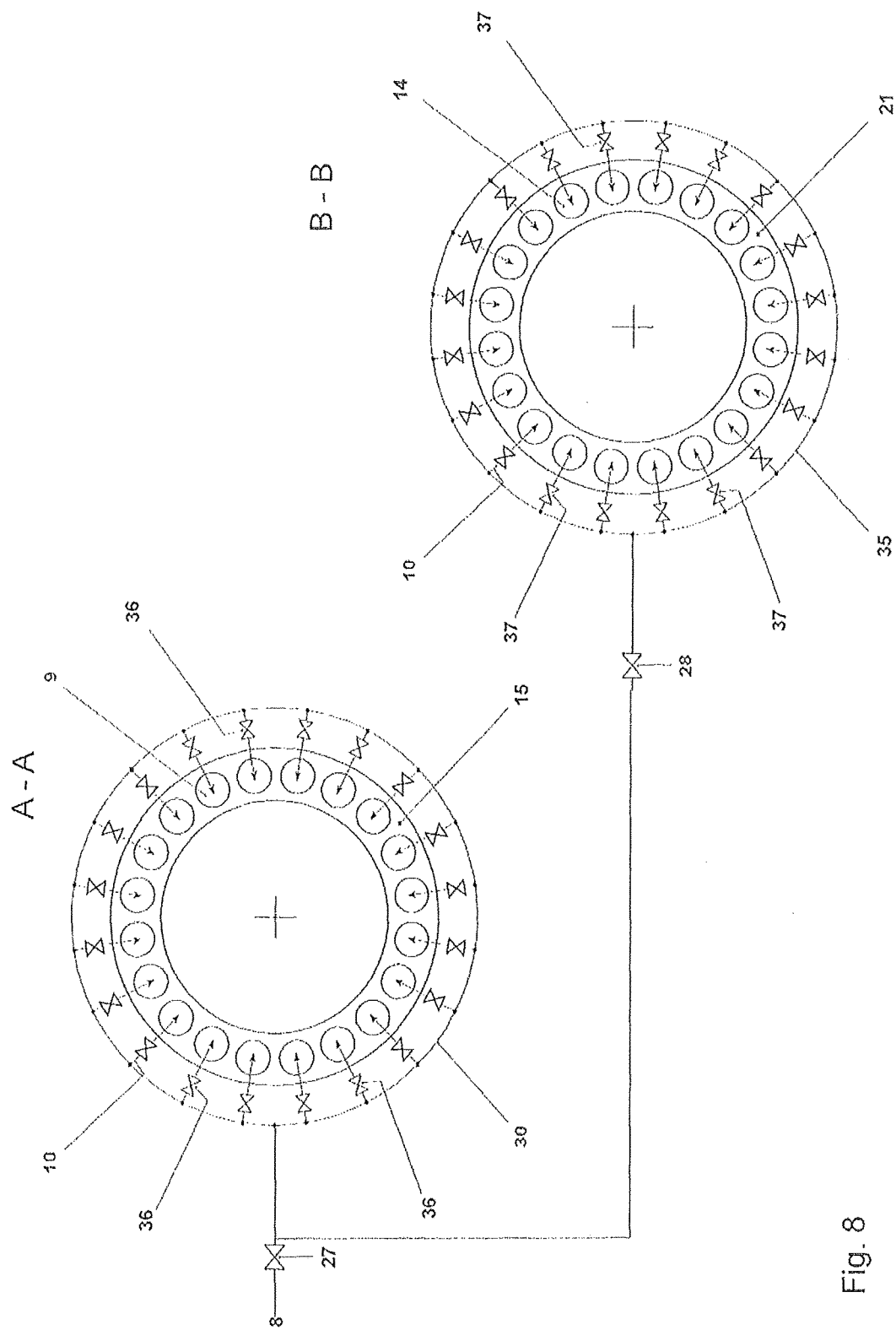
FIG. 8 shows a cut through the section A-A of the first burner and section B-B of the second combustor with a fuel gas distribution system individual fuel gas control valves for all first burners and all second fuel injections.

FIG. 8 shows another example for a fuel distribution system in the section A-A of FIG. 2 cut through the first burner and section B-B cut through the second combustor of FIG. 2.

The fuel 8 is supplied via a main fuel line and the total fuel flow is controlled by a main fuel control valve 27. The fuel line is branched into a supply line to the first-burner fuel ring main 30 and a supply line to a second fuel injection fuel ring main 35.

From the first-burner fuel ring main 30 each first burner 9 is supplied via a fuel feed 10 and a single first-burner fuel control valve 36 with fuel.

From the second fuel injection fuel ring main 35 each second combustor 14 is supplied via a fuel feed 10 and a single injector fuel control valve 37 with fuel.

This arrangement allows individual flow control to each first burner 9 and each second combustor 14. Thereby flow can be shifted according to any desired operating concept from first burners 9 to second combustors and between first burners 9 and between second combustors 14.

As shown a second fuel control valve 28 can be arranged in the fuel line to the supply line to the second fuel injection fuel ring main 35 to control the overall fuel split between the first burners 9 and second combustors 14. However, it can also be omitted in another embodiment.

FIGS. 9A/9B are based on the FIG. 8 but there is no second fuel injection fuel ring main 35, and there is no supply line branched off to it and no second fuel control valve 28.

As shown in FIG. 9B, in this example each second combustor 14 is supplied by a separate fuel supply line a, b, c, t, which is branched off from the fuel feeds 10 of the first burners 9 downstream of the single first-burner fuel control valves 26 shown in FIG. 9A.

This arrangement allows individual flow control to each first burner 9 and each second combustor 14. Thereby flow can be shifted according to any desired operating concept from first burners 9 to second combustors and between first burners 9 and between second combustors 14. Since each second combustor's 14 fuel supply is branched off from the fuel feed 10 of an upstream burner 9 downstream of the respective single first-burner fuel control valve 36 the fuel flow can be shifted any first burners 9 to a second combustor 14 downstream practically without impact on the total fuel 8 flow.

For all shown arrangements can or annular architectures or any combination of the two is possible.

All the explained advantages are not limited to the specified combinations but can also be used in other combinations or alone without departing from the scope of the disclosure. Other possibilities are optionally conceivable, for example, for deactivating individual sequential combustors 7, i.e. first burner 9 and second combustor 14 or groups of sequential combustors 7 at part load operation. Further, the dilution gas 17 can be re-cooled in a cooling gas cooler before use as dilution gas.

What is claimed is:

1. A gas turbine, comprising:
   a compressor;
   a sequential combustor arrangement having a plurality of sequential combustors, each sequential combustor including,
   a first-burner with a first fuel injection,
   a first combustion chamber,
   a second combustor with a second fuel injection,
   a second reaction zone arranged sequentially in a fluid flow connection, and
   a fuel distribution system for supplying fuel to the first fuel injection and to the second fuel injection, the fuel distribution system including a fuel control valve and a fuel ring main for supplying fuel to the first fuel injection; and
   a turbine downstream of the sequential combustor arrangement,
   wherein at least one supply line to the second fuel injection is branched off downstream of the fuel control valve for supplying fuel to the first fuel injection, and in that a second fuel control valve is arranged in the at least one supply line to the second fuel injection.

2. The gas turbine as claimed in claim 1, wherein the sequential combustor arrangement comprises:
   a first group of first-burners connected to a first first-burner group fuel ring main;
   a second group of first-burners connected to a second first-burner group fuel ring main;
   a first group of a second fuel injectors connected to a first sequential-group fuel ring main; and
   a second group of second fuel injectors connected to a second sequential-group fuel ring main;
   wherein a first-burner group fuel control valve is arranged in a supply line to the first first-burner group fuel ring main,
   a second burner group fuel control valve is arranged in a supply line to the second first-burner group fuel ring main,
   a supply line for the first sequential-group fuel ring main is branched off downstream of the first first-burner group fuel control valve, and a first sequential-group fuel control valve is arranged in the supply line for the first sequential-group fuel ring main, a supply line for the second sequential-group fuel ring main is branched off downstream of the second first-burner group fuel control valve, and a second sequential-group fuel control valve is arranged in the supply line for the second sequential-group fuel ring main, and wherein each second fuel injector of the first group of second fuel injectors is arranged downstream of one first-burner of the first group of first-burners in one sequential combustor.

3. The gas turbine as claimed in claim 1, wherein the sequential combustor arrangement comprises a first group of first-burners connected to a first first-burner group fuel ring main, a second group of first-burners connected to a second first-burner group fuel ring main, a first group of a second fuel injectors connected to a first sequential-group fuel ring main, and a second group of second fuel injectors connected to a second sequential-group fuel ring main, wherein a first-burner group fuel control valve is arranged in a supply line to the first first-burner group fuel ring main, a second burner group fuel control valve is arranged in a supply line to the second first-burner group fuel ring main, a supply line for the first sequential-group fuel ring main is branched off downstream of the first first-burner group fuel control valve, and a first sequential-group fuel control valve is arranged in the supply line for the first sequential-group fuel ring main, a supply line for the second sequential-group fuel ring main is branched off downstream of the second first-burner group fuel control valve, and a second sequential-group fuel control valve is arranged in the supply line for the second sequential-group fuel ring main, and wherein each second fuel injector of the first group of a second fuel injectors is arranged downstream of one first-burner of the second group of first-burners in one sequential combustor.

4. The gas turbine as claimed in claim 1, wherein each second fuel injector of the sequential combustor arrangement is connected to a supply line branched off downstream of the second first-burner group fuel control valve and having a fuel feed including an injector fuel control valve.

* * * * *